March 5, 1963  R. E. BUSCH  3,080,112
REGISTERING APPARATUS
Filed Feb. 29, 1960  11 Sheets-Sheet 11
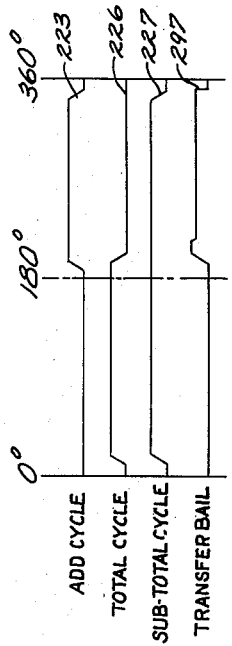
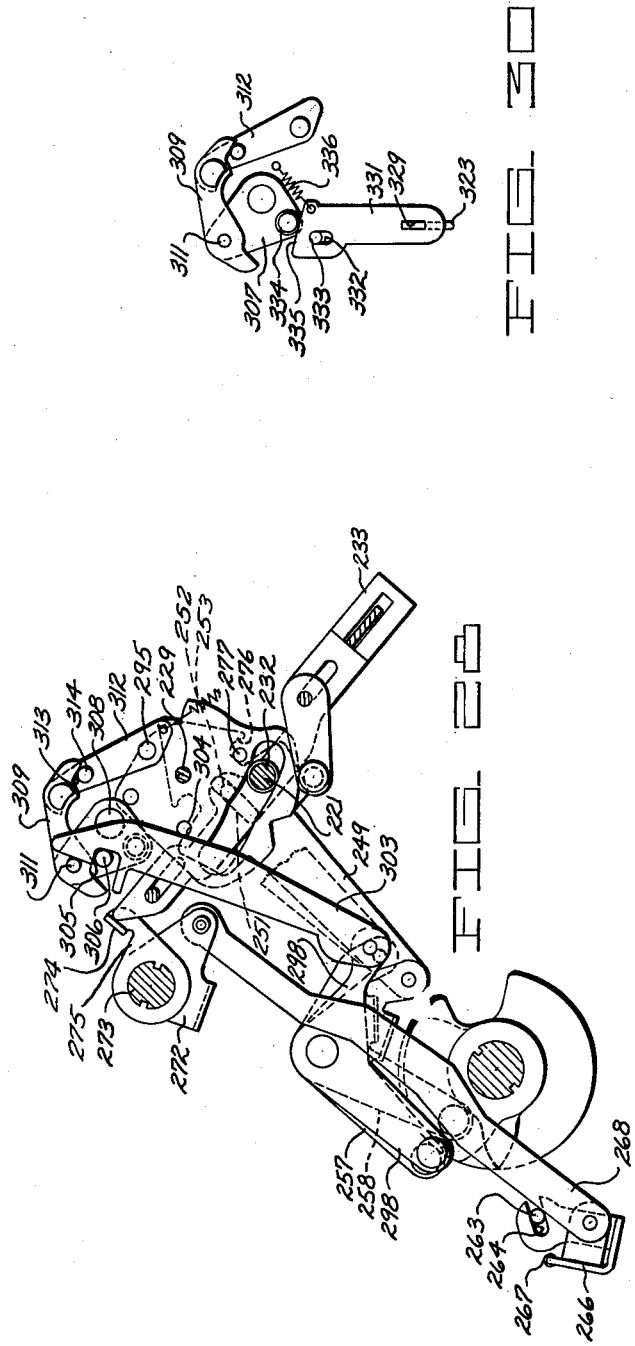

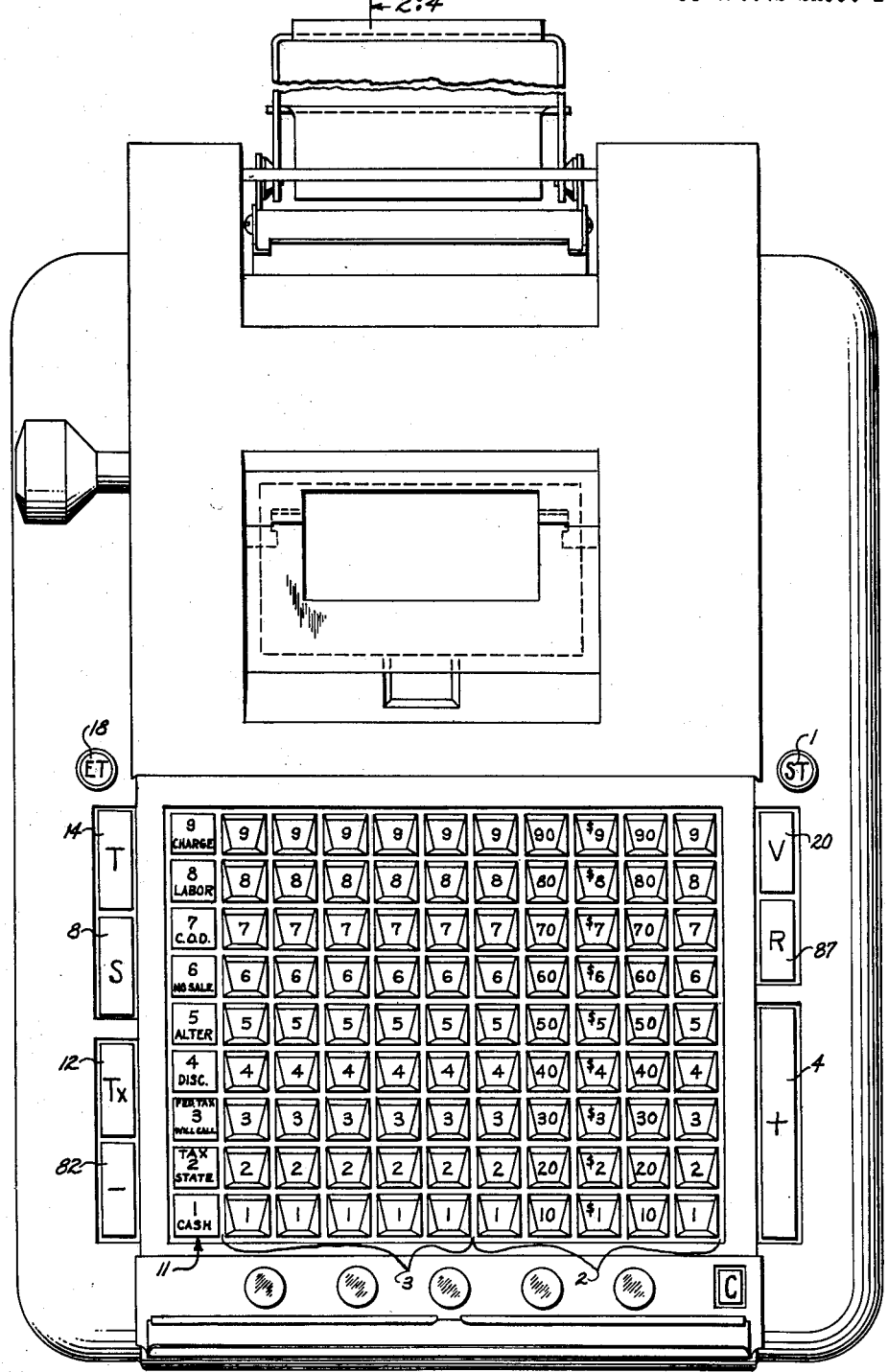

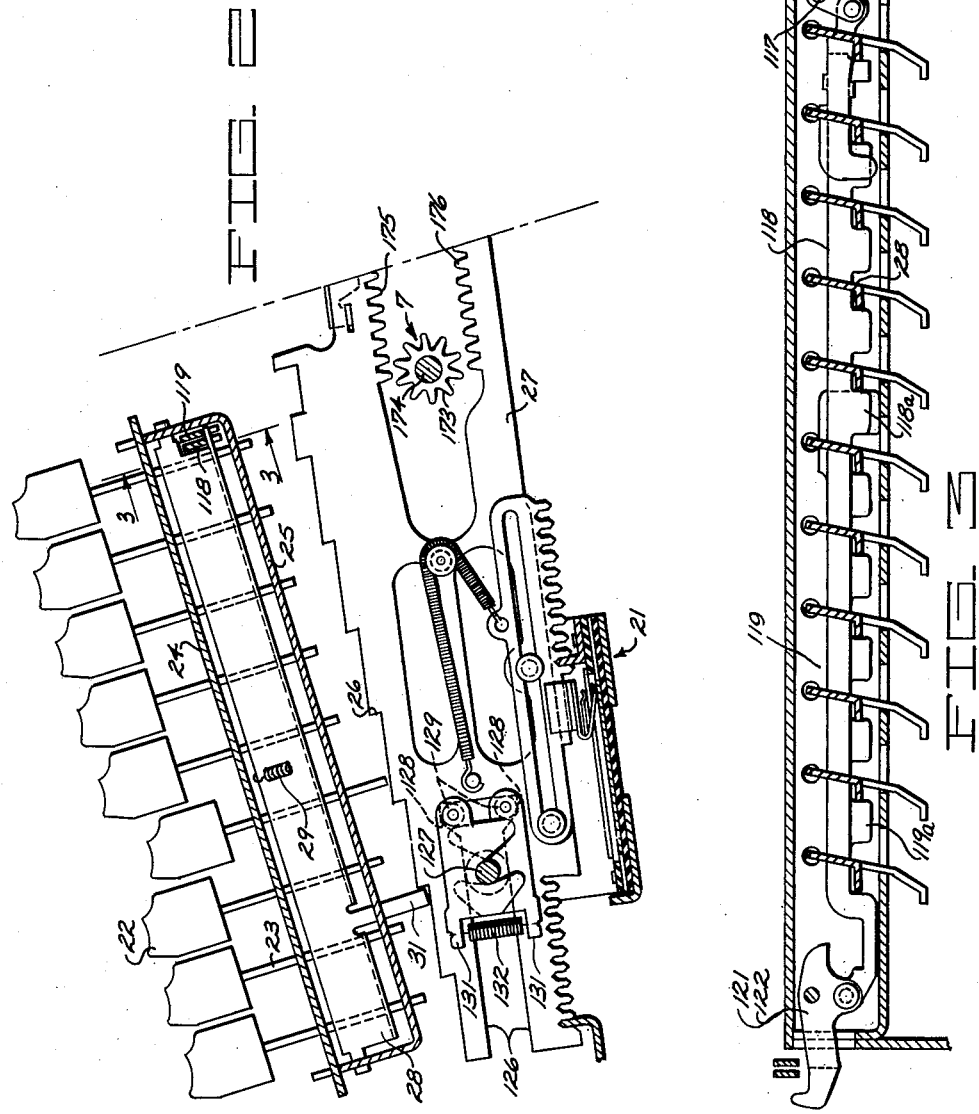

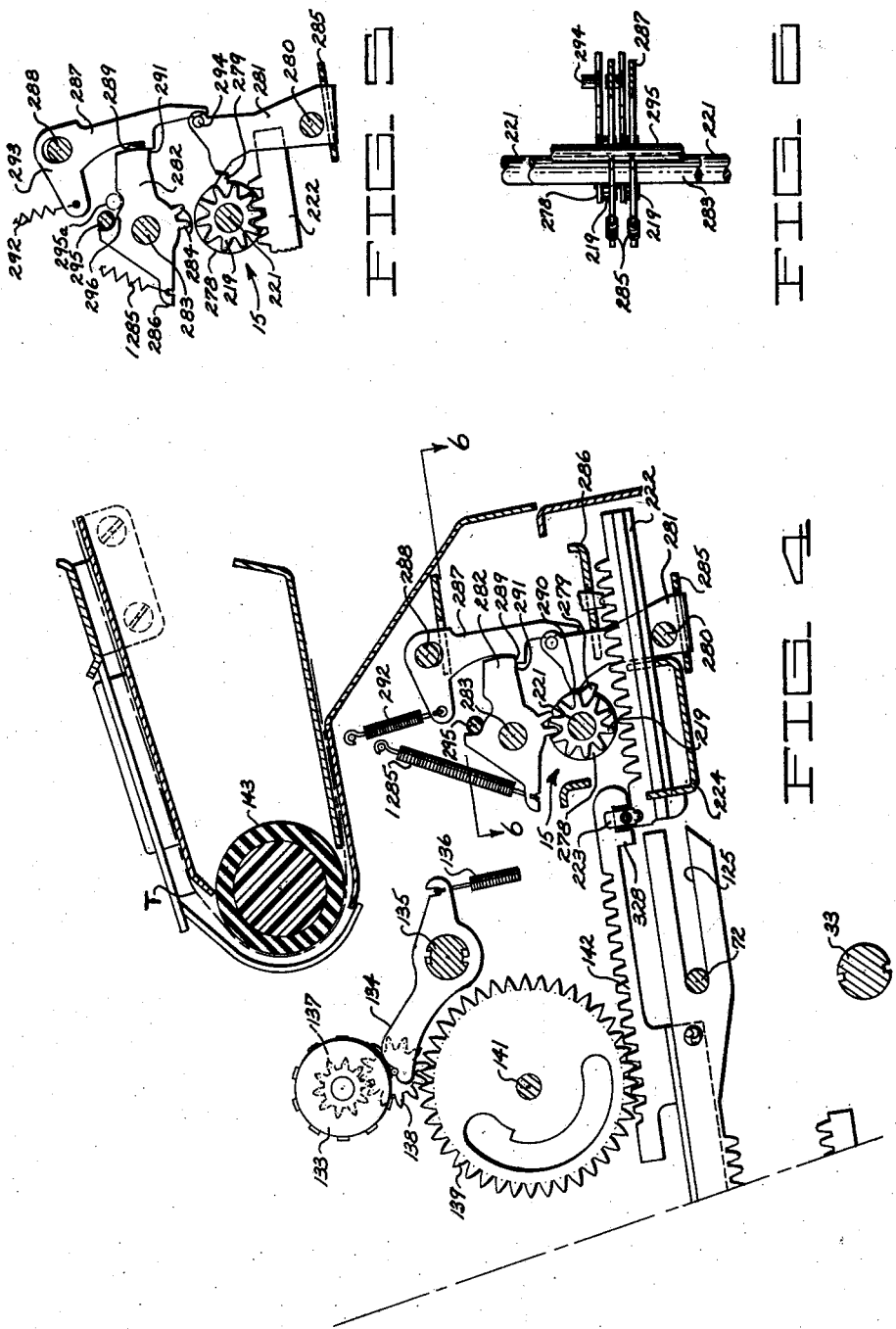

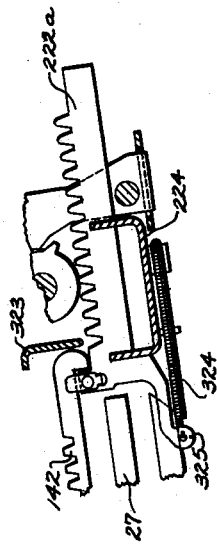
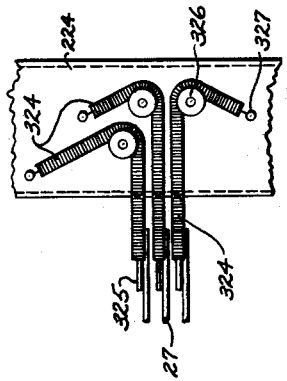

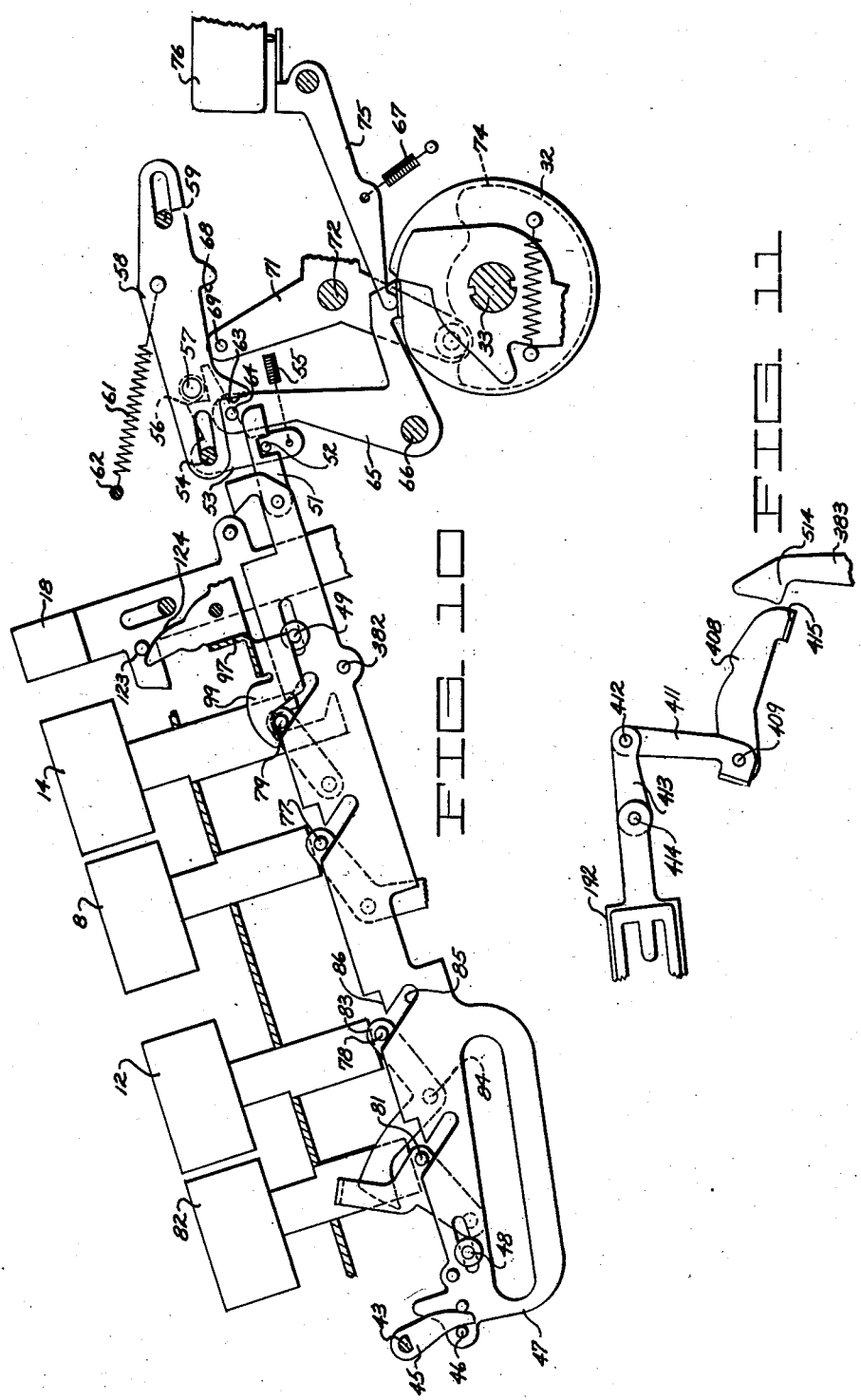

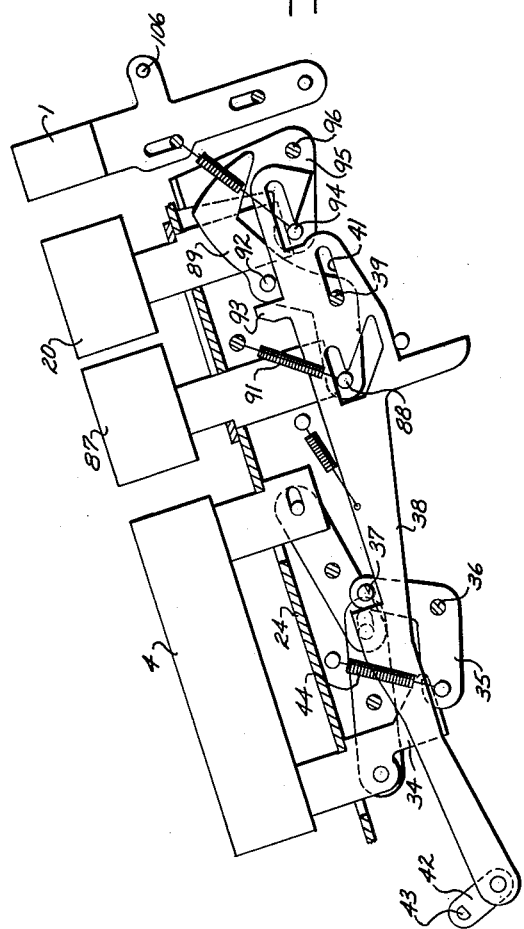

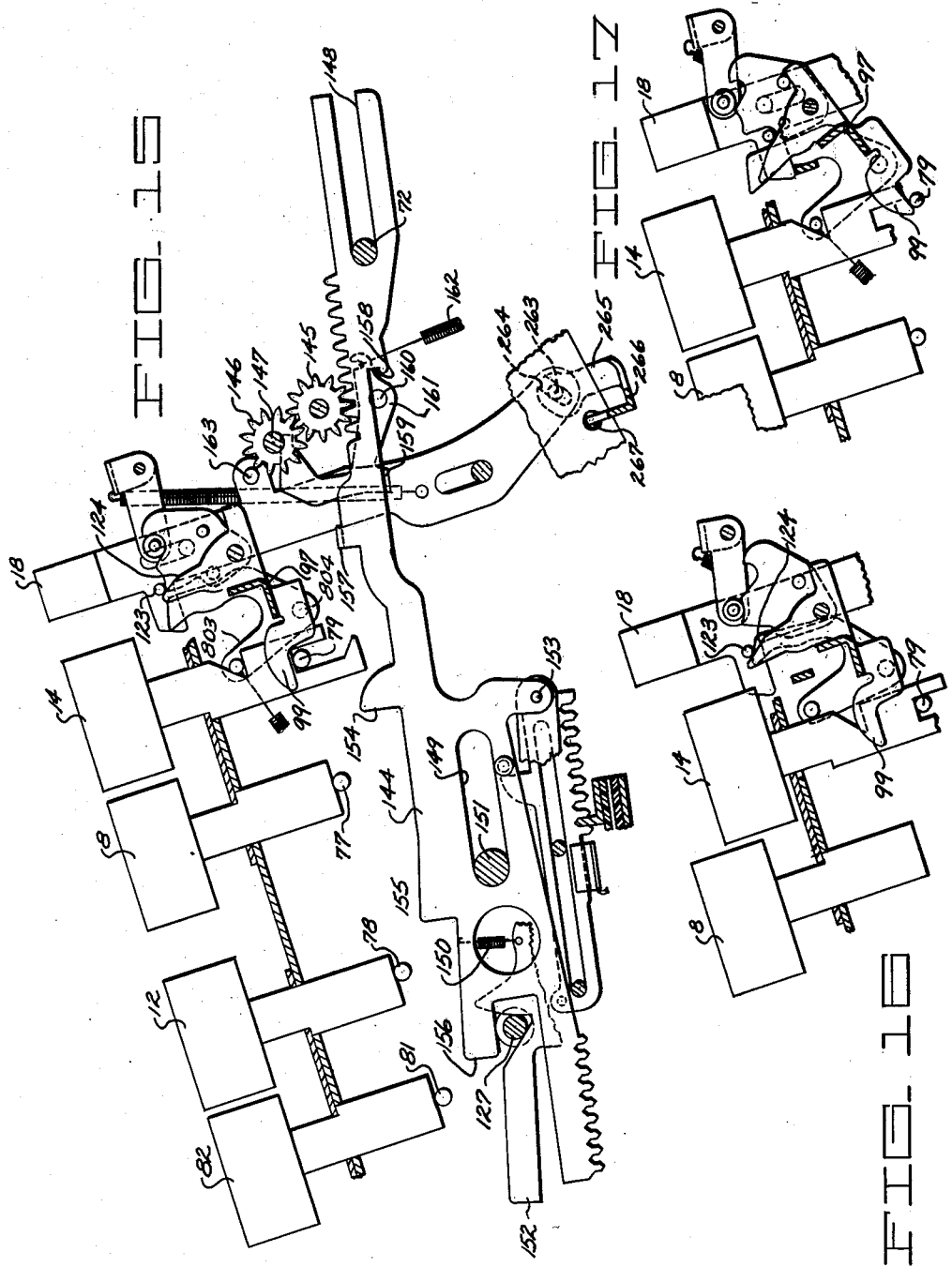

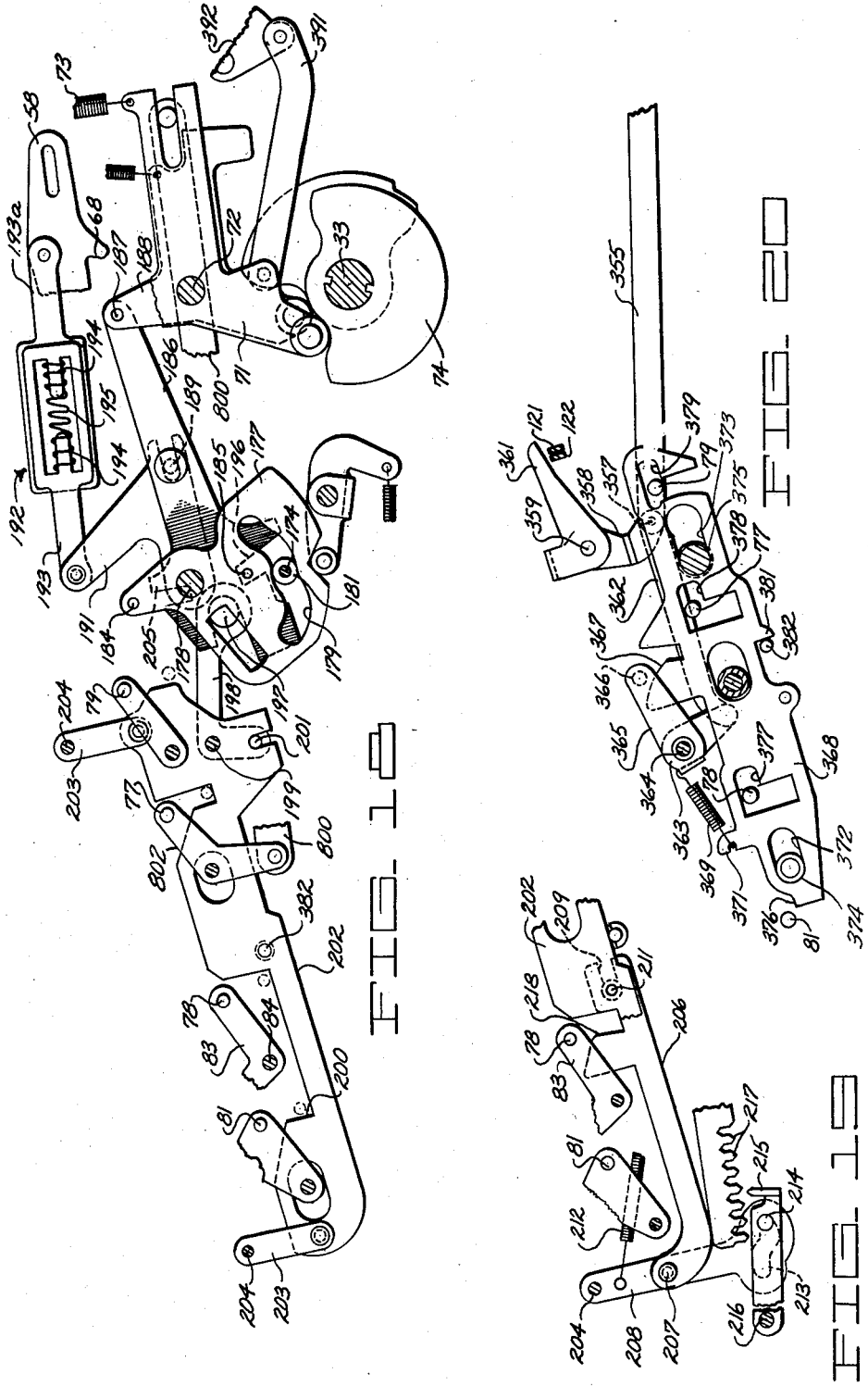

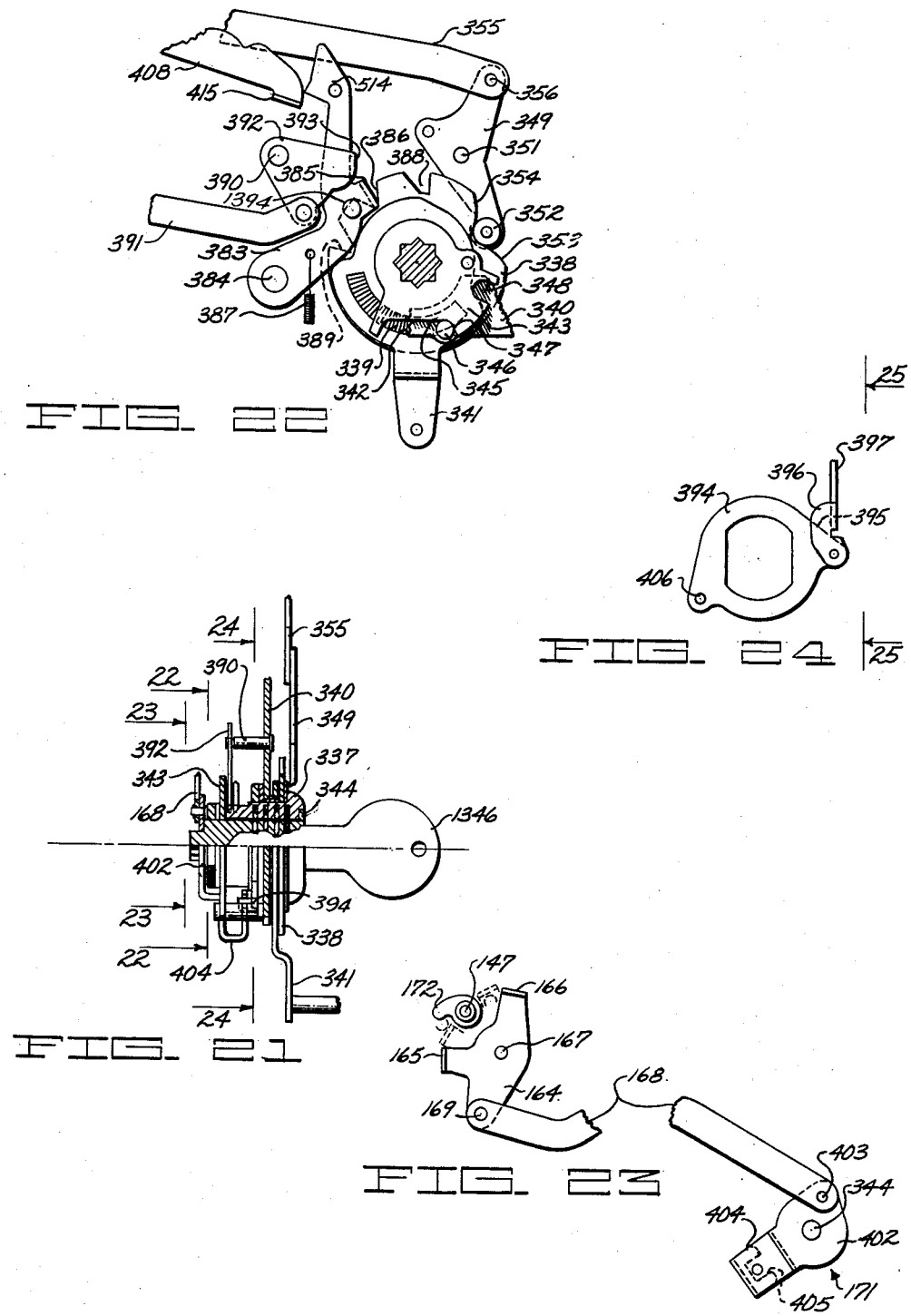

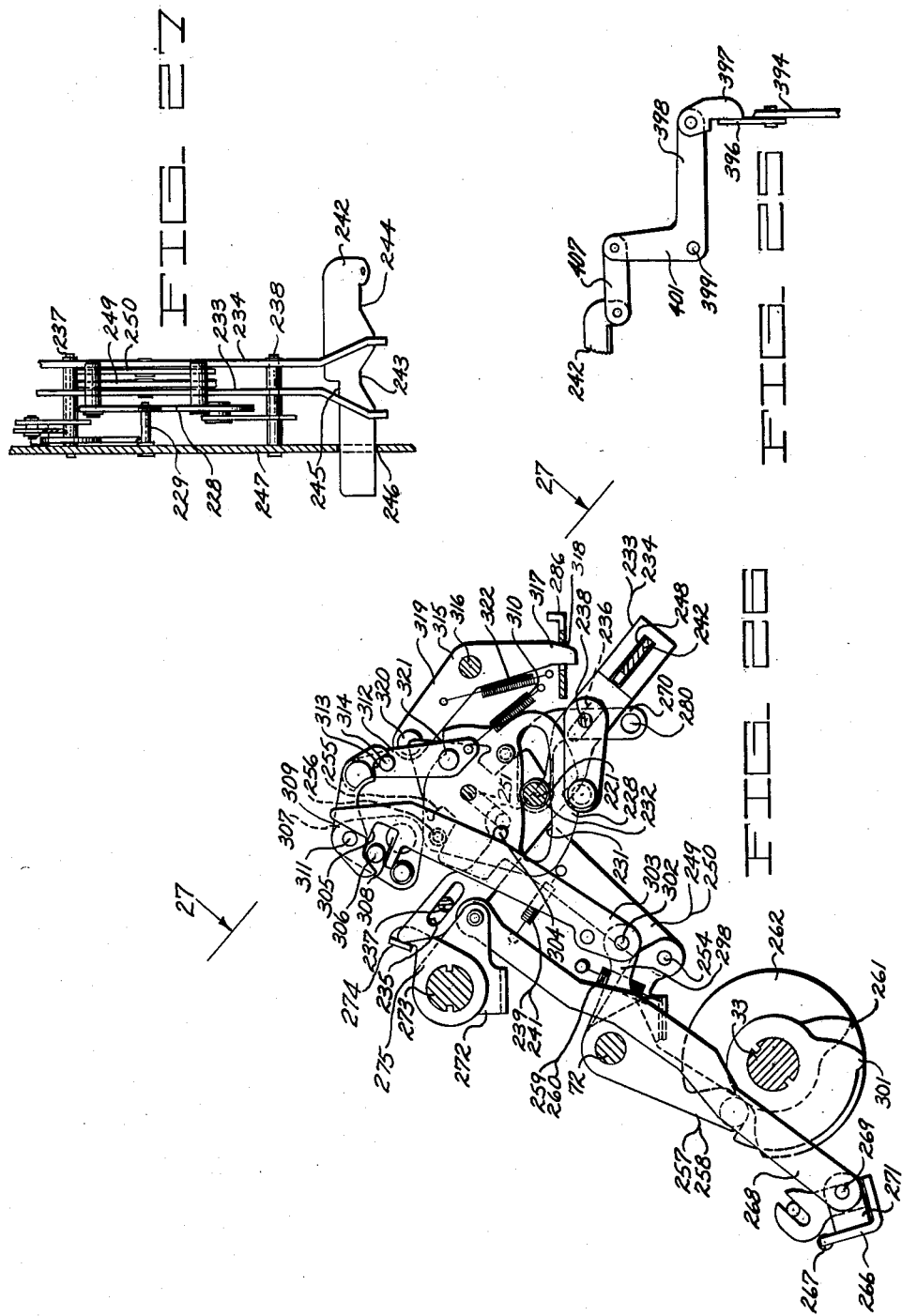

United States Patent Office 3,080,112
Patented Mar. 5, 1963

3,080,112
REGISTERING APPARATUS
Richard E. Busch, La Puente, Calif., assignor to Clary Corporation, San Gabriel, Calif., a corporation of California
Filed Feb. 29, 1960, Ser. No. 11,780
13 Claims. (Cl. 235—60.31)

This invention relates to improvements in a sales transacting machine disclosed and claimed in the co-pending patent application of Scozzafava et al., S.N. 682,551, filed on September 6, 1957, now Patent No. 3,017,081.

The above machine lacks provisions for taking a grand subtotal by which a clerk could balance his cash drawer at the end of his shift.

Also there is a lack of provision for taking a grand total at the end of a day by which a quick and accurate check of total sales could be made. A grand total print out would also provide a way of double checking a tape punch associated with such machine for possible mechanical errors.

Therefore, it becomes a principal object of this invention to provide a small but reliable accumlator into which the total of each sales transaction will be entered.

Another object is to provide a novel locking means for preventing unauthorized persons from being able to print out the grand subtotal or the grand total of a duplex machine.

The manner in which the above and other objects of the invention are accomplished will be readily understood on reference to the following specification when read in conjunction with the accompanying drawings, wherein:

FIG. 1 is a plan view of a machine embodying the present invention.

FIG. 2 is a partial longitudinal sectional view through the machine which, combined with FIG. 4, is taken along the line 2:4—2:4 of FIG. 1.

FIG. 3 is a sectional view taken along the line 3—3 of FIG. 2, illustrating the key release mechanisms.

FIG. 4 is a partial longitudinal sectional view through the machine and is taken along the rear portion of the line 2:4—2:4 of FIG. 1.

FIG. 5 is a sectional side view showing the second accumulator in transfer condition.

FIG. 6 is a plan view of the second accumulator and is taken along the line 6—6 of FIG. 4.

FIG. 7 is a sectional view similar to FIG. 5 but showing the second accumulator in normal condition.

FIG. 8 is a bottom view of FIG. 7.

FIG. 9 is an illustration of the sales receipt produced by the machine.

FIG. 10 is a sectional elevation view of the clutch and some of its controls.

FIG. 11 is a sectional elevation view of the delay switch control linkage.

FIG. 12 is a sectional elevation view of certain of the machine control bars.

FIG. 13 is a sectional elevation view of the latch mechanism associated with the void and start control bars.

FIG. 14 is a sectional elevation view of part of the linkage for clearing the entire keyboard under control of the start key.

FIG. 15 is a sectional elevation view of the symbol rack and associated controls.

FIG. 16 is a view of certain parts shown in FIG. 15 in positions effected by depression of the total bar.

FIG. 17 is a view of certain parts shown in FIG. 15 in positions effected by depression of the end of transaction key.

FIG. 18 is a sectional elevation view of the primary accumulator positioning control mechanism.

FIG. 19 is a sectional elevation view of the symbol rack control lock.

FIG. 20 is a sectional elevation view of the controls for locking the control bars during a grand subtotal and a grand total operation.

FIG. 21 is a sectional view of the keylock and control linkage for the second accumulator.

FIG. 22 is a sectional elevation view taken along line 22—22 of FIG. 21.

FIG. 23 is a sectional view taken along line 23—23 of FIG. 21 showing control linkage for the symbol wheel for grand total and grand subtotal operations.

FIG. 24 is a sectional view taken along the line 24—24 of FIG. 21.

FIG. 25 is a sectional view taken along the line 25—25 of FIG. 24 showing certain of the control linkage for the second accumulator.

FIG. 26 is a sectional elevation view showing the linkage and controls for raising and lowering the second accumulator.

FIG. 27 is a sectional view taken along the line 27—27 of FIG. 26.

FIG. 28 is a sectional elevation view similar to FIG. 26 but showing the linkage in an "add" control position.

FIG. 29 is a chart illustrating the engagement time of the second accumulator with the racks.

FIG. 30 is a sectional elevation view showing rack extension control mechanisms.

The sales transaction machine in which the present invention is incorporated is disclosed in the aforementioned application, S.N. 682,551. Other details of the machine are disclosed in the Robert E. Boyden, Patent No. 2,583,810, issued on January 29, 1952, and the Edward P. Drake, Patent No. 2,472,696, issued on June 7, 1949. Therefore, for the sake of brevity, only those portions of the machine which embody the present invention or cooperate therewith will be illustrated and described herein. It should be understood, however, that the invention may be equally well applied to other types of calculating and registering machines.

Describing first the general operation of the machine in effecting a sales transaction, a start key 1 (FIGS. 1 and 12) which forms part of a machine conditioning device, is first depressed. The latter conditions the machine for operation and releases any amount keys which may have been previously depressed. Thereafter, the amount of an item is entered into a section 2 of the keyboard and the identification number of such item involved in the transaction is entered into a section 3 of the keyboard. An add bar 4 is then depressed causing operation of the machine to print such information on a preprinted form 5 (FIG. 9), as indicated on line 6 of the form. The form is automatically advanced and any number of additional items may likewise be entered and recorded. During each such add operation, the amount of the item is accumulated in a primary accumulator, generally indicated at 7 in FIG. 2.

After all items of a particular sales transaction have been entered, a subtotal key 8 is depressed to obtain a total. Thereafter, the amount of tax is entered into the keyboard section 2, then one of several keys in a key row 11 is set to indicate the type of tax, and a tax bar 12 is depressed, entering the amount of the taxes in the accumulator 7 and recording the same as indicated in line 13 of FIG. 9. Different types of taxes may be entered on successive lines. A total key 14 is then depressed to obtain a subtotal of the amount due in the transaction. This amount is printed in a line 16 following the last tax or special charge entry but is accompanied by a total indicating symbol.

Thereafter, a code representing the type of transaction, i.e., Cash, Charge, C.O.D., Etc., is entered in the row of keys 11 and the sales person's identification number is entered in one or more of the remaining rows of key section 3. The add bar 4 is again depressed to enter this amount which is recorded, as indicated on line 17, on the receipt form.

Thereafter, an "End of Transaction" key 18 is depressed which causes a cycle of operation of the machine to automatically record the date, machine number, section number, transaction number, and it again prints the total amount due in the transaction, as indicated on line 19 on the receipt form, and at the same time the total amount is transferred into a second accumulator, generally indicated at 15 (FIGS. 4 and 5). The latter key also disables the machine, requiring reenablement thereof by depression of the start key 1 as an incident to the next sales transaction.

In the event of an erroneous entry of any data in the machine, a void bar 20 may be depressed at any time which clears the primary accumulator 7, requiring a new operation to be initiated by depression of the start key 1.

A sensing unit partially shown at 21 (FIG. 2), is provided for controlling a punching unit described in the aforementioned pending application, S.N. 682,551.

Describing now the construction of the machine, each of the amount keys 22 of the keyboard includes a key stem 23 (FIG. 2) guided for vertical movement in aligned slots formed in keyboard frame plates 24 and 25. The lower edges of the key stems cooperate with spaced shoulders 26 formed on aligned racks 27 to limit the forward advancement of each rack to a number of increments corresponding to the numerical value of the key depressed in the associated row.

Spring means (not shown) are provided for normally holding the keys in raised position and means are further provided for latching each key in rack arresting position upon depression thereof. For this purpose, each key has a cam lobe (not shown) which is engageable by a locking bail 28, there being one such bail in each row. Each bail is pivoted at its opposite ends to front and rear walls extending upwardly from the key frame plates 25. As a key is depressed, its cam lobe will move past the locking bail camming the latter outwardly and as the lobe passes below the bail, the latter will be retracted partly by a spring 29 to a position wherein it latches the key in rack arresting position.

A zero block 31 depends from each locking bail 28 and, when no key in a row associated with the particular rack is depressed, the bail will locate the zero block in a position directly in front of one of the shoulders 26, thereby preventing forward movement of the rack during a subsequent cycle of the machine. However, when any amount key is depressed and latched down, its locking bail 28 will be held outwardly sufficiently to maintain its zero block out of the path of the aligned rack.

The machine is driven by a motor (not shown) through a cyclic clutch 32 (FIG. 10) having its driving side connected to a rotatable cam shaft 33. The clutch is effective to cause a complete rotation of the shaft 33 in a counterclockwise direction during each cycle of operation.

The machine is controlled to perform different operations by depressing corresponding machine control bars, certain of which have been described heretofore. The add bar 4 (FIG. 12) has two stems thereof slidably mounted in slots in the upper keyboard plate 24, the forward stem 34 thereof overlying a pin on a bell crank 35 which is fulcrummed on a frame pin 36 and is provided with a pin 37 lying directly behind a shoulder on an actuating link 38. The latter is guided at its rear end by a frame pin 39 embraced by elongated slot 41 in the slide. The forward end of the slide is pivotally connected to an arm 42 fastened to a rock shaft 43 (see also FIG. 10) which is suitably pivoted in a manner not shown in the machine frame. Upon depression of the add bar, the bell crank 35 will be rocked counterclockwise against the action of a tension spring 44 causing the slide 38 to rock the shaft 43 clockwise. An arm 45 (FIG. 10) fastened to the shaft 43 engages a pin 46 on a clutch control bar 47, causing the latter to slide forwardly over frame pins 48 and 49 which are embraced by elongated slots in the bar.

A hook 51 pivotally attached to the rear end of the bar 47 normally hooks over a pin 52 on a trigger arm 53 to rock the latter clockwise about its fulcrum pin 54 against the action of a spring 55. The arm 53 is provided with a latching shoulder 56 normally lying directly in front of a roller 57 carried by a power slide 58. The latter is provided with elongated slots embracing the pin 54 and a frame pin 59. A relatively strong spring 61 is tensioned between the slide 58 and a frame pin 62 whereupon, as the arm 53 is rocked to release the slide, the latter will be advanced sharply to the left in FIG. 10, causing a depending shoulder 63 to engage a pin 64 on a clutch dog 65 which is fulcrummed at 66 and normally held in its illustrated clutch disengaging position relative to the clutch 32 by a light tension spring 67. The clutch dog will thus be removed from engagement with the clutch, enabling the latter to become engaged for a complete cycle.

When the power slide 58 is driven to the left, a shoulder 68 thereon moves adjacent a pin 69 carried on a cam follower 71 (see also FIG. 18). The latter is pivotally mounted on a stationary shaft 72 and is urged counterclockwise by a spring 73 (FIG. 18) against a cam 74 keyed on the shaft 33. Part way through a machine cycle, the cam 74 becomes effective, through the follower 71, to move the slide 58 back to its normal illustrated position wherein it may be relatched by the arm 51, permitting the clutch dog 65 to be returned clockwise by the spring 67 to its normal illustrated clutch disengaging position.

The clutch dog 65 is also effective, when rocked counterclockwise to cause engagement of the clutch, to rock a control switch lever 75 against the action of the spring 67 to thereby close normally open switch 76 in the machine motor circuit.

Pins 77, 78, 79 and 81 underlying the stems of the control bars 8, 12, 14 and a minus control bar 82, respectively, are fixed to individual arms, like arm 83, all pivoted on frame pins, like pin 84, and urged into their upper illustrated positions by individual springs (not shown). It will be noted that the clutch control bar is provided with inclined slots, like slot 85, underlying each of the above pins whereby depression of any of the control bars 8, 12, 14 and 82 will move the clutch control bar to the left to cause engagement of the clutch. It will be noted that when the control bar is moved to the left by depression of one of the above control bars, shoulders, like shoulder 86, thereon will prevent depression of any of the other control bars.

A repeat bar 87 (FIG. 12) is provided to cause repetitive cycles of the machine to repetitively enter an amount set up in the keyboard. For this purpose, the stem of the repeat bar overlies a pin 88 carried on an arm 89 fulcrummed on the frame pin 39 and urged clockwise by a spring 91. When the repeat key is depressed, the arm 89 is rocked counterclockwise causing a pin 92 thereon to engage a projection 93 on the slide 38, causing the latter to advance to clutch engaging position by rocking the shaft 43.

The stem of the void bar 20 overlies a pin 94 on a bell crank 95 (see also FIG. 13) which is fulcrummed on a frame pin 96. The pin 94 overlies a forwardly extending arm of a bail 97 (FIG. 13) fulcrummed at 98 and extending across the machine where it is provided with a second arm 99 (FIGS. 10, 15, 16 and 17) overlying the pin 79 associated with the total bar 14. Thus, as the void bar 20 is depressed, the bail 97 is rocked counterclockwise to depress pin 79 and thus cause engagement of the clutch in the same manner as does the total bar 14.

The bail 97, when rocked into a counterclockwise position, is maintained in such a position and, for this purpose, the bail is provided with a latch 101 pivoted thereto at 102 and urged upwardly by a spring 103 to engage the undersurface of a part 108 secured to the machine framework. As the bail 97 is moved into its counterclockwise position, a latching shoulder 104 on the tip 101 snaps in front of the part 108. In this position, a ledge 105 on the latch tip is located directly below a pin 106 carried by the start key 1. Accordingly, when the start key 1 is depressed, the pin 106 will release the latch tip 101, allowing the bail 97 and the void key to return to their normal positions.

The start key 1 is not effective to cause operation of the machine, but is effective to release any depressed amount keys. For this purpose, the pin 106 also overlies one end of a lever 109 (FIG. 14) fulcrummed on frame pin 111 and provided with an ear 112 (see also FIG. 3) underlying arm of a bell crank 113 fulcrummed on a frame pin 114. The latter bell crank underlies the arms of two bell cranks 115 and 116, both independently pivoted on a frame pin 117 and pivotally connected at their lower ends to key release bars 118 and 119, respectively. The latter bars are supported at their opposite ends by somewhat similar independently acting bell cranks 121 and 122, respectively. The release bar 118 is provided with projections 118a lying directly in front of extensions on the key locking bails 28 associated with amount keys in the right-hand keyboard section 2 (FIG. 1). The bar 119 is provided with projections 119a lying directly in front of the key latch bails associated with the amount keys in the left-hand section 3. Accordingly, when the start key 1 is depressed to condition the machine for a new operation, the bell crank 113 will be rocked to shift both key release bars 118 and 119 to the right (in FIG. 3) to release any depressed amount keys.

The end-of-transaction key 18 (FIGS. 1, 10, 15, 16 and 17) is effective to cause operation of the machine to record the information indicated on line 19 of FIG. 9 and, for this purpose, its stem carries a pin 123 engageable with a camming surface 124 formed on an extension of the bail 97 whereupon depression of the key 18 will cam the bail counterclockwise to depress the total bar operated pin 79 and effect engagement of the main clutch 32.

Means (not shown) are provided for yieldably advancing the racks 27 during the first half of a machine cycle and for returning them to their illustrated home positions after a printing operation and during the latter half of the cycle. The racks are provided with slots 125 (FIG. 4) and 126 (FIG. 2) which are slidably guided over support shafts 72 and 127, respectively. The shaft 127 is slidably mounted in suitable guide slots (not shown) in the frame of the machine.

In order to yieldably advance the various racks, each rack has opposed notches 128 located at the closed end of its slot 126, the notches being normally engaged by rollers 129 carried by pawls 131 pivotally mounted on the shaft 127. A tension spring 132 extends between each pair of pawls whereby to urge the latter outwardly and thus hold the rollers 129 in driving engagement with the notches 128, thereby yieldably advancing any racks which are otherwise free to do so. When any one of the racks 27 is arrested by a depressed amount key stem or by a zero block 31, the rollers 129 will ride out of the notch 128 of the blocked rack and along the edge of the slot 126. The racks 27 are each operatively entrained with a respective one of a series of numeral printing wheels 133 (FIG. 4). Each printer wheel is provided with a series of type characters spaced therearound and advancing in value from "0" to "9."

Each printer wheel is rotatably mounted on an individual arm 134 loosely keyed on a printer control shaft 135 and spring urged clockwise by a spring 136. A gear 137, integral with each printer wheel, is maintained in continual mesh with an idler 138, also carried by the arm 134.

Except during printing operations, the arms 134 are held in their illustrated positions by the shaft 135 wherein the idlers 138 mesh with associated idlers 139 journalled on a fixed shaft 141. The latter idler gears continuously mesh with offset rack sections 142 integral with respective ones of the various racks 27.

During the mid-portion of a cycle, and after the various racks 27 have been advanced to different positions differentially limited by depressed ones of the amount keys, the shaft 135 is rocked clockwise, allowing the springs 136 to likewise rock the arms 134 (if otherwise allowed to do so), causing the printing wheels 133 to move into printing contact with a printing ribbon (not shown) and a paper strip T, as the strip passes over a platen 143. The strip T comprises a series of the aforementioned preprinted forms 5 (FIG. 9) arranged in end-to-end fashion.

After printing is effected, the arms 134 are returned to their normal positions by the shaft 135 and the racks are subsequently returned to their home positions.

A special symbol rack 144 (FIG. 15) is provided and is entrained with a special symbol type wheel (not shown) similar to the numeral type wheels 133, to print symbols indicative of the type of operation performed by the machine. The symbol type wheel is located next to the group of numeral type wheels and is carried by an arm similar to the arms 134 and controlled by shaft 135.

The symbol type wheel is set by the rack 144 through a pair of intermeshing gears 145 and 146. The latter is fixed on a shaft 147 on which is fixed a similar gear (not shown) meshing with an idler similar to the idlers 139 (FIG. 4) which is entrained with the symbol print wheel.

The symbol rack 144 is provided with guide slots 148 and 149 embracing shaft 72, and a frame stud 151, respectively. The rack is yieldably driven to the left during each machine cycle by the aforementioned drive shaft 127, which engages a notch in a pawl 152 pivoted at 153 to the symbol rack and urged upwardly by a spring 150 so as to cause the rack to yieldably follow the shaft 127 until the latter is blocked under control of different ones of the control keys. For this purpose, shoulders 154, 155, 156 are formed on the symbol rack which are arranged to be differentially arrested by pins 77, 78 and 81 underlying the subtotal, tax and minus keys, when the rack has advanced four, three and two increments, respectively. A blocking ear 157 on the rack is arranged to limit the rack against the lower end of the stem of the total key 14 when the latter is depressed and after the back has advanced five increments.

The rack 144 will advance seven increments as an incident to depression of the void key, until a shoulder 158 thereon engages a stop ear 159 on a lever 161 which is normally held in its illustrated position about pivot stud 160 by a spring 162.

The rack will advance eight increments as an incident to depression of the end-of-transaction key 18, and, for this purpose, a pin 163 is fastened to the stem of the key 18 and is effective upon depression of this key to engage the upper edge of the lever 161, lowering the stop ear 159 out of the path of the shoulder 158, so that the rack will advance until the right-hand end of the slot 149 strikes the frame stud 151.

During add operations, the symbol rack will be blocked from moving from its illustrated home position by mechanism to be described later. In such position, the symbol type wheel will be ineffective to print a symbol.

During a grand subtotal or grand total operation the rotation of the shaft 147 is controlled by a blocking lever 164 (FIG. 23), having two stop ears 165 and 166. The lever 164 is rotatably mounted on a machine cross shaft 167 and is under the control of link 168 loosely pinned at 169 to the lever, and at its opposite end is loosely pinned at 403 to a part of the grand totaling mechanism, generally indicated at 171, which will be described later. During a grand subtotal operation link 168 will rock the lever 164 clockwise, placing the ear 165 into the path of an arm 172 securely mounted on the shaft 147. As the symbol rack 144 moves to the left it will rotate shaft 147 until the arm 172 strikes the ear 165 stopping the rack at an equivalent movement of one increment, and the symbol type wheel at the respective symbol. During a grand total operation, the link 168 will rock the lever 164 counterclockwise placing the ear 166 into the path of the arm 172 whereby the time of rotation the arm will strike the ear stopping the rack at a position of six increments and, through the aforementioned gearing, rotating the symbol print wheel to its respective position.

The primary accumulator 7 (FIG. 2) is basically disclosed in the aforementioned Drake Patent No. 2,472,696 and the Scozzafava et al. pending application S.N. 682,551. Reference may be made to said patent and pending application for a complete disclosure of details of the accumulator not specifically shown herein.

In general, the primary accumulator 7 comprises a plurality of accumulator gears 173 independently mounted on an accumulator shaft 174.

For the purpose of raising the accumulator 7 from its neutral position shown in FIG. 2 into its upper position wherein the accumulator gears 173 mesh with the upper rack gear sections 175 of the associated racks or lowering the unit wherein the gears 173 mesh with rack gear sections 176 there is provided a box cam 177 (FIG. 18) pivoted on a frame pin 178 and having a cam groove 179 embracing a roller 181 rotatably mounted on one end of the accumulator shaft 174. A similar cam embracing a roller (not shown) supports the opposite end of the shaft 174 and is suitably connected to cam 177 to move in concert therewith.

The box cam 177 carries a pair of pins 184 and 185 located on opposite sides of the pivot pin 178. These pins are adapted to be selectively engaged by a hook member 186 pivotally connected at 187 to an upwardly extending arm of a cam follower 188. The hook member is connected through a pin and slot connection 189 to a lever 191 which is fulcrummed on the pivot pin 178 at its lower end and connected at its upper end to the aforementioned power slide 58 through a yieldable coupling, generally indicated at 192. The latter comprises two coupling link parts 193 and 193a arranged in side by side relation and each having a pair of inwardly facing tongues 194. A compression spring 195 is fitted in compression over the tongues of both parts to normally hold the link at its illustrated length whereby, through lever 191, to normally hold the hook 186 with a slot 196 therein in embracement with the pin 185. Accordingly, if the hook 186 were to be maintained in its illustrated lowered position during the succeeding cycle, the cam follower 188 would be effective, through the hook member, to rock the cam 177 counterclockwise to lower the accumulator into a subtractive relationship with the racks in the right-hand section of the machine.

The hook member 186 is connected through a pin and slot coupling 197 to a bell crank 198 fulcrummed on the frame pin 199 and connected through pin and slot connection 201 to an accumulator positioning control bar 202. The latter is suspended for fore and aft movement by links 203 pivoted on frame pins 204.

Normally during an add or tax entry, the power slide 58 will be advanced forwardly as described heretofore to cause engagement of the main clutch 32 (FIG. 10), and in so doing, the power slide will, through the yieldable coupling 192, rock the lever 191 counterclockwise to raise the hook member 186 into a position wherein a slot 205 therein embraces the pin 184 on the cam 177. Accordingly, when the cam follower 188 is rocked clockwise, it will, through the hook member 186, likewise rock the cam 177 to raise the accumulator into an addition relation with the racks.

It will be noted that the accumulator positioning control bar 202 is provided with blocking shoulders, like shoulder 200, in alignment with pins 77, 79 and 81 associated with the subtotal, total and minus bars, respectively. Therefore, when any of these bars is depressed, its associated pin will be positioned directly behind an aligned blocking shoulder, thus preventing the power slide 58 from raising the hook member 186 out of its subtractive controlling position during the succeeding cycle. In this case, the yieldable coupling will be merely compressed as the power slide 58 is advanced to cause engagement of the main clutch.

Subtotaling is effected, as described in detail in the above Scozzafava et al. application, Serial No. 682,551, by moving a subtotal control link 800 (FIG. 18) to the left to render a cam 801 effective to control the accumulator positioning control mechanism to take a subtotal operation. The link 800 is actuated by an arm 802 carrying a pin 77 which underlies the subtotal bar 8. Also, the link is actuated by an extension (not shown) projecting from an interlock lever 803 (FIG. 15) which is fulcrummed at 804 and is rocked clockwise upon depression of the total bar 14. Thus, depression of the total bar, in effect, causes a subtotal operation.

Means are provided under control of the hook member 186 and bell crank 198 for preventing movement of the symbol rack 144 (FIGS. 15 and 19) out of its home position during an add operation. For this purpose, a symbol block controlling bar 206 is provided, the latter being loosely pinned at 207 to an arm 208. At its opposite end the bar 206 has a slot 209 which engages a pin 211 mounted on the control bar 202. The arm 208, being rotatably mounted on a frame pin 204, is spring urged to the right by a spring 212 which holds the left-hand of the slot 209 up against the pin 211 of the control bar.

The arm 208 is extended and provided with a cam slot 213 which guides a pin 214 on a symbol rack lock 215 which is pivoted on a frame pin 216.

When a machine cycle is initiated by depression of the add bar, the hook member 186 will be rocked upwardly as noted herein above, rocking the bell crank 198 counterclockwise which, in turn, through pin and slot combination 201 will pull the control bar 202 to the right, thereby allowing the spring 212, through arm 208, to urge the bar 206 to follow the pin 211 to the right. The cam slot 213 will accordingly cam the symbol rack lock 215 upwardly between the teeth 217 to block the symbol rack 144 against forward movement, thereby preventing rotation of the symbol wheel.

It will be noted that a blocking shoulder 218 is formed on the bar 206 in alignment with the pin 78 associated with the tax bar. Accordingly, when the tax bar is depressed, the pin 78 will be positioned directly behind the blocking shoulder 218 to prevent locking of the symbol rack in its home position even though an add operation is entailed.

The secondary accumulator, generally indicated at 15 (FIGS. 4 through 8) comprises a plurality of accumulator gears 219 independently mounted on an accumulator shaft 221. The gears 219 mesh with respective ones of rack extensions 222 which are clamped at 223 to the offset rack portions 142 of the main racks. The extensions 222 are guided for longitudinal movement by a comb-like support plate 224.

Near the end of a sales transaction, after the code representing the type of sale and the sales person's identification number has been recorded on the sales slip, the operator depresses the "end-of-transaction" key 18. At a little past half cycle, through linkage to be later described, the secondary accumulator 15, is lowered into mesh with rack extensions 222 so that as the racks 27, having transferred the total from the primary accumulator into the printer during the first half cycle, will during their return home in the latter half cycle, enter such total into the secondary accumulator.

During a grand total operation, the secondary accumulator 15 is lowered into mesh with the rack extensions 222 at the beginning of the cycle. During the first half cycle the rack extensions read out the secondary accumulator and, through offset rack sections 142 set the printer wheels at their respective positions. After printing and before the racks begin their homeward travel the accumulator, which is now cleared, is demeshed from the racks.

FIG. 29 graphically illustrates the respective times, during different operations, that the secondary accumulator is lowered into mesh with the rack extension 222. Line 223 represents the lowering of the accumulator during the latter half of a machine end-of-transaction cycle, it being noted that all entries into the secondary accumulator are of an additive nature. The line 226 represents the meshing of the accumulator during the first half of a grand total cycle. The line 227 represents the meshing of the accumulator for almost a full cycle during a grand sub-total operation.

The lowering of the secondary accumulator is effected through a box cam 228 (FIGS. 26, 27 and 28), pivoted on a cross shaft 229 and having a cam groove 231 embracing a roller 232 rotatably mounted on one end of the secondary accumulator shaft 221. A similar cam embracing a roller (not shown) supports the opposite end of the shaft 221 and is suitably connected, in a manner not shown, to cam 228 to move in concert therewith.

A pair of control slides 233 and 234 are provided, each having a pair of elongated slots 235 and 236, which embrace frame pins 237 and 238, respectively. The slides are under the influence of respective ones of a pair of tension springs 239 and 241 which attempt to move the slides to the left (FIG. 26), but due to a slidable control bar 242 they are normally held in their illustrated neutral positions as shown in FIG. 26 and FIG. 27.

The control bar 242 having detents 243, 244 and 245 is at one end slidably mounted in a slot 246 in an accumulator side frame 247, and at its opposite end is connected to control linkage which will later be described.

The slides 233 and 234 have slots 248 which embrace the control bar 242 so that if the control bar were moved to the right in FIG. 27 the slide 234, under the influence of the spring 241, would be pulled forward into detent 243 of the control bar 242. If the control bar, however, were moved to the left, the slides 233 and 234, under the influence of springs 239 and 241, would be pulled forward into respective detents 243 and 244.

A pair of similar swordfish levers 249 and 250 are provided, having slots 251 which embrace pins 252 and 253 of the respective slides 233 and 234. Therefore, when one or both of the slides is pulled forward into its respective detent, the respective swordfish lever, through its pin and slot connection will be rocked counterclockwise about its pivot 254, whereby a slot 255 of the lever will embrace a pin 256 on the box cam 228.

The swordfish levers 249 and 250 are loosely pinned at their pivot points 254 to respective independently movable cam followers 257 and 258. The latter are pivotally mounted on the stationary cross shaft 72, and are urged counterclockwise by springs 259 and 260 against respective cams 261 and 262 keyed on the shaft 33.

To perform a grand total operation, the control bar 242 is moved to the right in FIG. 27 so that the slide 234 only is pulled forward, thereby moving the swordfish lever 250 counterclockwise so that its slot 255 embraces the box cam pin 256. The cam 262, at the beginning of the cycle, will rock cam follower 258 clockwise, pulling the swordfish 250 downwardly, thereby rocking the box cam counterclockwise to lower the accumulator into mesh with the rack extension 222. A little past half cycle the cam will allow the spring 260 to rock the cam follower 258 counterclockwise, which, in turn, raises the swordfish lever 250 and, through box cam pin 256, the box cam will be rocked clockwise, raising the accumulator out of mesh with the rack extensions.

To perform a grand subtotal operation, the control bar 242 is moved to the left, in FIG. 27, to allow both slides to move forward, thereby moving both swordfish levers forward, so that their respective slots 255 will both embrace the box cam pin 256. Upon rotation of the shaft 33, the cam 262 will rock cam follower 258, and through its swordfish lever the box cam will be rocked, lowering the accumulator, into mesh. At a little past half cycle, instead of raising the accumulator, the cam 261 will rock the cam follower 257, thereby holding the swordfish lever 249 down, so that the accumulator will stay in mesh until just before the end of the cycle, at which time the accumulator is raised as aforedescribed.

To enter the totals of individual transactions into the secondary accumulator, there is provided a pin 263 on the lower end of the "end-of-transaction" key 18 (FIG. 15) which rides in a slot 264 in an arm 265 extending out from a bail 266. Upon depression of key 18, through the pin and slot connection, the bail 266 (see also FIGS. 26 and 28) is rocked clockwise about its pivotal support 267 in the machine frame. A link 268 is loosely pinned at 269 to a second arm 271 of the bail 266, the link 268 being loosely pinned at its opposite end to a bail lever 272 which is pivotally mounted on a machine cross shaft 273.

The rocking of the bail 266 clockwise will pull the lever 268 downwardly (FIG. 28) thereby rocking the bail lever 272 clockwise about the shaft 273. An ear 274, formed at the end of an arm 275 of the bail 272, will push the slide 233 rearwardly, i.e., to the right in FIGS. 26 and 28, into detent 245 (FIG. 27). The slide 233, moving rearwardly, will also move the swordfish lever 249 clockwise into its position shown in FIG. 28, whereby a second slot 276 of the swordfish lever will embrace a second cam pin 277 on the cam 228. Upon rotation of the shaft 33 the cam 261 will, at a little past half cycle, rock the cam follower 257, in effect lowering the swordfish lever 249 which, through the pin and slot connection, will rock the box cam 228 clockwise lowering the accumulator into mesh with the respective rack extensions 222.

The tens transfer mechanism for the secondary accumulator comprises, in each order, a disc 278 formed integral with each respective accumulator gear 219 (FIGS. 4 through 6). The discs 278 each carries on its outer periphery a protruding shoulder 279, which is positioned between the two teeth of the accumulator which represent the numbers "9" and "0." A lever 281 in each order is pivotally mounted on a cross shaft 280 and is held in its aligned position by two comb-like plates 285 and 286. Each lever has a protruding nose 290, which rides on the outer periphery of the respective disc 278, so that as the accumulator gear passes from "9" to "0" the protruding shoulder 279 of the disc will rock the lever 281 clockwise about its pivot (FIG. 5). To hold the lever in continuous contact with the disc 278 as the secondary accumulator is lowered, there is provided an L-shaped link 270 (FIG. 26) which is securely mounted on the accumulator shaft 221 at one end, and the opposite end carries the lever shaft 280, so that as the accumulator is lowered the lever arms 281 will follow.

Transfer pawls 282 are rotatably mounted on a stationary shaft 283, and each pawl 282 carries a pair of teeth 284 which, when the accumulator is in its raised position, engage the respective gear 219 to prevent accidental movement.

Each transfer pawl 282 is urged to rotate in a clockwise rotation by a tension spring 1285, connected between an ear 286 of the pawl and a machine frame pin, but is prevented from rotating by a latch lever 287, which is pivotally mounted on a cross shaft 288. The latch lever has a detent shoulder 289 which engages the edge 291 of the pawl 282. The latch is urged clockwise to engage the edge 291 of the pawl by a tension spring 292 connected between an arm 293 of the latch lever and a machine frame pin.

During passage of an accumulator gear between "9" and "0" and as the disc rocks the lever 281, as aforedescribed, a pin 294 of the lever 281 will rock the lever 287, in the next denominational order to the left, releasing the transfer pawl 282 from the detent shoulder 289, leaving the pawl under the influence of the springs 1285 to advance its associated accumulator gear when otherwise allowed to do so.

In FIGS. 4 and 5 it should be noted that the hole in the latch lever 287 which embraces the shaft 288 is slightly elongated vertically so that at the time the pin 294 rocks the lever 287 out of engagement with the pawl 282, the lever will be pulled upwardly, under the action of spring 292, to prevent any chance of an erroneous relatching.

The pawl 282 under the influence of the spring 1285, after being unlatched, will have its movements controlled by a bail 295, whose control mechanism will be described later. The bail 295, lying against a shoulder of a recess 296 of the pawl 282, prevents the pawl from being rotated under the action of its spring until the racks have been returned to their home positions and the secondary accumulator has been raised to its neutral position engaging with the teeth 284. At this time the bail 295 will move to the dotted line position 295a illustrated in FIG. 5, which will permit the spring 1285 to rotate the pawl until the shoulder of the recess 296 again rests against the bail which allows the teeth 284 to have moved the accumulator gear one increment counterclockwise.

The bail 295 will hold the pawl in this position until the next succeeding "end-of-transaction" cycle. Approximately half-way through such cycle, and after the accumulator has been lowered into mesh with the rack extensions 222 as graphically illustrated by line 297 in FIG. 29, the bail 295 will be rocked back to its original position, bypassing its original position enough so that the pawl can pick up the lost motion action of the latch 287 when it was unlatched. Thus, the transfer pawl will become related.

The mechanism for controlling the actions of the bail 295 consist of a cam follower 298 (FIGS. 26 and 28) pivoted on the cross shaft 72. One arm of the follower carries a roller which rides on the outer periphery of a cam 301 and the other arm is loosely pinned at 302 to a hook lever 303. The hook lever 303 rests on a pin 304 on the box cam, but when the box cam 228 is rocked clockwise, which only occurs during an "end-of-transaction" cycle, the pin 304 will rock the lever 303 counterclockwise about its pin 302, causing a detent 305 of the hook lever 303 to embrace a pin 306 mounted on a pivot arm 307. Upon rotation of the shaft 33, and approximately half-way through the cycle, the cam 301 will rock the cam follower 298 clockwise, pulling the hook lever 303 downwardly thereby rocking the pivot arm 307 counterclockwise about a frame pin 308. A link 309, loosely pinned at 311 to the pivot arm, is loosely pinned at its opposite end to a link 312. The latter, in turn, is pivoted to the transfer control bail 295.

The link 309 has at one end a protruding blocking edge 313 which abuts against a pin 314 of the link 312. This blocking edge prevents the link 312 from rotating counterclockwise about its pivotal connection to bail 295 under the inffuence of a spring 310, and at the same time holds the bail against the bottom edge of the pawl recess 296. As the pivot arm 307 is rocked by the hook lever 303, it will pull the link 309 forward. The link 312 will, in turn, rotate the bail 295 counterclockwise which will pick up any released transfer pawls 282 to return them to latched position.

During a grand subtotal or a grand total operation, the secondary accumulator is lowered into mesh with the rack extensions 222 at the beginning of the cycle, and as the racks 27 and extensions 222 move forward, to the left in FIG. 4, the accumulator gears which register a significant amount rotate clockwise until the protruding shoulder 279 strikes the protruding nose 290 of the arm 281, thereby stopping the accumulator gear and also stopping the respective rack at a position representing the number stored in the respective accumulator gear. To prevent the arm 281 from rocking at the time of contact, a blocking bell crank 315 (FIG. 26) is provided, which is rotatably mounted on a cross shaft 316. An arm 317 of the bell crank 315 is movable in a slot 318 of the comb-like alignment plate 286, which is slidably mounted in slots in the accumulator side frames (not shown). A second arm 319 of the bell crank carries a pin 320.

The bell crank 315 will be rocked clockwise only during the cycles that the box cam 228 is rocked counterclockwise. This occurs only during a grand sub-total or a grand total operation. As the box cam rotates counterclockwise an edge 321 tthereon will strike the pin 320, rocking the lever 315 about the shaft 316, and the arm 317 will push the plate 286 to the left in FIGS. 4 and 26 to a position directly behind the levers 281. The bell crank will stay in this position until the box cam returns to its neutral position wherein the bell crank and alignment plate will return to their normal positions under the influence of a tension spring 322.

The ilustrated machine allows for entry of amounts in the five rows of keys on the right-hand side of the keyboard, section 2. The left-hand side of the machine, section 3, is reserved for additional information such as type of sale, sales clerk number, etc. In order that the capacity of the secondary accumulator may be as large as possible, there is substituted for the rack extensions 222 in those orders aligned with section 3 of the keyboard, rack extensions 222a (FIG. 7) which prevents the numbers entered in the keyboard section 3, from being entered into the secondary accumulator, thereby allowing these accumulator wheels to accumulate the tens transfer carryovers from their respective next lower denominational orders.

The rack extensions 222a move similar to the extensions 222 during the first half of the cycle, but at the beginning of the latter half of the cycle after the secondary accumulator has been lowered into mesh with the rack extensions, in preparation for accumulating the total of the transaction (and before the racks start their return home), a bail 323 will be lowered in between the teeth of all the extension racks 222a which are associated with the keyboard section 3 only, thus, as the racks 27, offset rack extensions 142 and rack extensions 222 return home, the extensions 222a are held in their half cycle positions by the bail 323 preventing rotation of their respective accumulator gears. Upon raising of the secondary accumulator gears back to their neutral positions, the bail 323 is also raised, releasing the extension racks to the influence of springs 324 which are connected to ears 325 of the extension rack 222a. As shown in FIG. 8, the springs 324 are tensioned around pins 326 mounted on the extension rack support plate 224, and are connected to pins 327 mounted on the same plate 224. The springs thereby return the racks to their home positions.

For the purpose of permitting the racks 142 aligned with the keyboard section 3 to return home without carrying with them the extension racks 222a, the shoulders 328 (FIG. 4) of such racks 142 are removed allowing these racks 142 to slide through the clamps 223 without enforcing the return of the extensions 222a.

During a grand subtotal operation, the bail 323 (FIG. 7) is not lowered, and the springs 324, being of sufficient strength, will return the racks at the same time that the offset racks 142 are returned, thereby returning the amount back into the secondary accumulator.

The bail 323 (FIG. 30) has it extreme ends protruding through guide slots (not shown) in the accumulator side frames. Such ends are embraced by slots 329 of two links 331 (only one shown), one being on either side of the accumulator. Each arm 331 has a slot 332 which embraces a pin 333 mounted on the accumulator side frame.

The links 331 are so located that the pivot arm 307 of the transfer bail linkage, when rocked counterclockwise about pin 308 toward the position shown in FIG. 30, will carry a roller 334 into engagement with a cam surface 335 on one of the links 331 thereby forcing the link downwardly into position as shown in FIG. 30, to place the bail 323 between the teeth of the extension racks 222a. A similar device is provided on the opposite side of the machine to lower the other links 331. Toward the end of the cycle the line, under the action of a tension spring 336, will be returned to its home position, lifting the bail 323 clear of the rack extensions 222a.

The means will now be described for effecting operation of the machine for a grand subtotal or a grand total operation. It will be noted that a lock is provided requiring insertion of a release key before the machine will effect a grand total operation. The same lock can also be arranged to require insertion of the release key to operate the machine for both a grand subtotal and a grand total operation.

A lock casing 337 (FIGS. 21 and 22) rotatably mounted in the machine side frame 340, has securely mounted on it a positioning disc 338 which is connected through a compression spring 339 to a bail 341, rotatably mounted on the casing 337. The disc 338 and the bail are juxtaposed each other and have slots 342 therein. Such slots are aligned with each other so that by placing the spring 339 in the slots 342 the bail and positioning disc will be yieldably connected in such a manner that if the bail were rocked either direction from its illustrated neutral position, and at the same time the lock casing were free to rotate, the positioning disc would move with the bail. However, if the lock casing were restrained, the positioning disc could not move. Therefore, the spring 339 would merely compress as the bail is rocked.

A restraining disc 343 is securely mounted on the barrel 344 of the lock. The disc has a detent 345 which, along with a frame pin 346, controls the rotation of the lock. The disc 343 is mounted so that in its neutral position a blocking edge 347 rests against the pin 346.

Upon rocking the bail 341 counterclockwise, FIG. 22, and since the restraining disc 343 presents no immediate blocking shoulder to the pin 346, it will rotate the positioning disc 338, through the spring 339, along with the lock casing and its barrel. However, should the bail 341 be rocked clockwise in that same view the disc 343 will be blocked from movement by the pin 346, thereby preventing rotation of the lock barrel and, in the absence of insertion of an appropriate release key 1346, preventing the casing and therefore the positioning disc 338 from rotating. Upon the insertion of the key 1346 which matches the tumblers of the lock, the casing would be free of the barrel and therefore would also be free of the restraining disc. Accordingly, the bail 341 would be effective to rotate the casing in either direction.

It should be noted at this point that by reorienting the restraining disc 343 so that a notch 348 would embrace the stationary pin 346, the disc 343, lock barrel 344 and casing 337 and, therefore the positioning disc 338, would all be normally restrained from rotation in either direction, thereby requiring insertion of key 1346 for rotation in either direction.

A cam follower 349 is pivotally mounted on a frame pin 351 and carries on one arm a roller 352, which rests at the vertex of two camming surfaces 353 and 354. Upon rotation of the disc 338 one of the two camming surfaces will rock the cam follower counterclockwise about its pivot. A link 355 loosely pinned at 356 to the cam follower will therefore be pushed forwardly, i.e., to the left in FIGS. 20 and 22. At its opposite end, the link is loosely pinned at 357 to a bail 358 which is rotatably mounted on a frame pin 359. As the link 355 is pushed forwardly it will rock the bail 358 clockwise causing an arm 361 thereon to rock the key release bell cranks 121 and 122 (see also FIG. 3) to clear the keyboard of any depressed keys as aforedescribed.

A link 362 (FIG. 20) is also loosely pinned at 357 to the link 355 and bail 358, so that it also will be pushed forwardly upon rocking of the disc 338 in either direction. The link 362 is pivotally connected at its forward end to a bail 363 pivotally supported at 364 and carrying a pin 366 engageable with a camming surface 367 of a control slide 368, and will cam said slide to the left (FIG. 20), against the action of a tension spring 369 connected between the bail 363 and an ear 371 of said slide. The slide 368 is guided for longitudinal movement by elongated slots 372 and 373 which embrace frame pins 374 and 375, respectively.

As the slide 368 is cammed forwardly, it places blocking edges 376, 377, 378 and 379 beneath respective pins 81, 78, 77 and 79 thereby preventing depression of any of the operating keys of the keyboard. At the same time an ear 381 of the slide 368 engages a pin 382 on the control bar 47 (FIG. 10) to move the latter to the left which as aforedescribed rocks the clutch dog 65 in effect to start a machine cycle.

Referring bac to FIG. 22, there is an arm 383 pivotally mounted on a frame pin 384 and which carries an ear 385. The ear 385, when the disc 338 is in its neutral position, rests in a detent 386 of the disc 338, and if the disc is rotated in either direction, the arm 383 will be cammed counterclockwise by the edges of the detent up to the outer periphery of the disc. Upon further rotation of the disc, the ear will be lowered under the influence of a spring 387 attached to the arm, down into one of the detents 388 or 389 depending upon which direction the disc 338 is rotated.

When the ear 385 has been lowered into one of the respective detents 388 or 389, and half way through a machine cycle a link 391 (FIGS. 18 and 22), pinned at one end to a blocking cam 392 and at its opposite end to the cam follower 188 is actuated by the latter to rotate the cam 392 clockwise about a frame pin 390 so as to position a blocking edge 393 of the cam behind a pin 1394 of the arm 383 thereby preventing the arm 383 from jumping out of the respective detent. This action will lock the disc 338 in adjusted position until the end of the cycle. The means for retaining the arm 383 in position during the first half of the machine cycle will be described later.

The control bar 242 (FIGS. 25 and 27) is positioned in either of its two positions, grand subtotal or grand total, through a selector disc 394 securely mounted on the lock casing 337. Upon rotation of the casing in a clockwise direction as seen in FIG. 24, the disc 394 will also rotate. Loosely pinned to an ear 395 of the disc is a link 396 which has an ear 397 (FIGS. 24 and 25), which is loosely pinned to a bell crank 398 pivotally mounted on a frame pin 399. An arm 401 of the said bell crank is loosely pinned to a link 407, which is pinned at its opposite end to the control bar 242, so that as disc 394 rotates clockwise it will pull the link 396 downwardly and through the ear 397 rock the bell crank 398 clockwise, therefore through the link 407 pull the control bar 242 (FIG. 27) to the right or into its grand total position as aforementioned.

Should the lock casing be rotated in a counterclockwise direction, the disc 394 would lift the link 396 and, through the ear 397, rock the bell crank 398 counterclockwise about its pivot, thereby through the link 407 push the control bar to the left into its grand subtotal position.

A bail 402, rotatably mounted on the lock barrel 344, is loosely pinned at 403 (FIG. 23) to the link 168, which as aforedescribed, controls the symbol wheel for printing grand subtotal and grand total symbols. Since the barrel fails to rotate during a machine operation when a key has been inserted, there is provided a U-shaped arm 404 on the bail 402. The U-shaped arm 404 has a slot 405 which embraces a pin 406, mounted on the disc 394 (FIG. 24), so that when the disc is rotated clockwise for a grand total operation it will likewise rotate the bail 402 clockwise so that through the link 168 the ear 166 will be placed in its proper blocking position relative to the arm 172, and in the same manner when the disc is rotated counterclockwise during a grand subtotal operation the bail 402 will move likewise, and through the same means, position the ear 165 into its proper position to block the arm 172.

When the control bail 341 (FIG. 22) is rocked, one of the first mechanical movements is the camming of the slide 363 (FIG. 20) which, through the pin 382, pulls the control bar 47 (FIG. 18) forwardly thereby normally initiating a machine cycle. Since this occurs during the first movement of the bail 341, not all of the mechanisms will have reached their proper positions by this time. To prevent this there is provided a bail 408 (FIG. 11) pivotally mounted on a frame pin 409. An arm 411 of the bail is loosely pinned at 412 to one end of a link 413. The link 413, at its opposite end, is mounted on a pin 414 of the yieldable coupling 192 (see also FIG. 18). Upon operation to perform a grand total or grand subtotal operation by rocking of the bail 341, a blocking head 514 on the arm 383 (FIGS. 11 and 22) is moved over an ear 415 of the bail 408, preventing the bail from free movement and, through said linkage preventing the coupling 192 from releasing the clutch. As the ear 385 of the arm 383 is lowered into one of the detents or notches 388 or 389 the blocking head 514 will drop clear of the bail 408 allowing it to rock upwards, whereby the coupling will free to complete the initiation of the machine cycle.

The bail 408 will hold its freed position for approximately the first half cycle during which time the ear 415 will block the head 514, preventing the arm 383 from rotating counterclockwise, thereby holding the arm 383 in its respective detent until the cam 392 is repositioned.

When machine operation is initiated through the keyboard by depression of any of the control bars the yieldable coupling 192 will be moved forward which, through the link 413, will rock the bail 408 counterclockwise. Since there will be no restriction, the bail will have free movement, allowing the coupling to initiate a machine cycle.

Describing the operation of the machine, initiation of a sales transaction registering operation is made by first pressing the start key 1 (FIGS. 12 to 14), thereby releasing the bail 97 from a counterclockwise rocked position to which it was previously moved by the end-of-transaction key 18 (FIG. 17) as an incident to completion of a preceding transaction operation. Thus, the machine is unlocked for operation.

The amount of each item forming part of a transaction, and its identifying data, are entered into the keyboard and the add bar is depressed to cause engagement of the clutch 32 (FIG. 10) through the mechanism shown in FIGS. 10 and 12. Accordingly, the main shaft 33 will be given one revolution causing cam 74 to actuate the accumulator control mechanism of FIG. 18 to thereby raise the accumulator into an additive entry condition relative to the racks. Subsequently, the racks are yieldably driven to the right in FIGS. 2 and 4 to enter the value of such item into the accumulator 7 and to set the printing wheels 133 prior to the printing operation which occurs before the racks are returned during the latter half of the cycle.

Upon entry of all of the items of the transaction, the subtotal bar 8 is depressed, causing the accumulator positioning control mechanism of FIG. 18 to lower the accumulator into a subtractive relation relative to the racks so that a subtotal may be taken.

Depression of the tax bar 12 will effect an additive entry of a tax item which has been entered in the keyboard in the same manner as the other additive entries are made, except that such entry is indicated on the form 5 (FIG. 9) by a tax symbol.

Depression of the total bar 14 to obtain the total due for the transaction will effect a subtotal operation in the same manner as caused by the subtotal bar 8 except that the same will be printed as a total on the form as indicated on line 16.

Depression of the end-of-transaction bar 18 (FIGS. 10 and 13) will rock the bail 97 counterclockwise to a latched condition, causing a total operation to ensue by pressing downwardly on the pin 79 (FIG. 10). Concurrently, the bar 18 will, through bail 266 (FIGS. 15 and 26), set accumulator control slide 233 to control the swordfish lever 249 to effect an additive entry into the secondary or grand total accumulator (FIGS. 4 and 5).

To perform a grand subtotal operation, the handle 341 (FIG. 22) is rocked counterclockwise from its illustrated position, causing cam disc 338 to actuate cam follower 349 and link 355 (see also FIG. 20) which, through the control link 368, actuates the clutch control bar 47 of FIG. 10 to initiate a cycle of operation of the machine. Such movement of the handle 341 also actuates the linkage of FIGS. 24 and 25 to move the accumulator control slide 242 (FIG. 27) to the left. The control slides 233 and 234 are thereby permitted to move to the left in FIG. 26 to control the respective swordfish levers 249 and 250 to cause a grand subtotal to be taken from the secondary accumulator.

To perform a grand total operation, the release key 1396 must first be inserted into the lock of FIG. 21 to permit clockwise rocking of the handle 341 which will cause operation of the machine and will effect shifting of the slide 242 to the right in FIG. 27 so as to permit movement of the slide 234 only, so that only the swordfish lever 250 will become active, in which case a grand total will be taken of the secondary accumulator.

Although I have described my invention in detail and have therefore used certain specific terms and languages herein, it is to be understood that the present disclosure is illustrative rather than restrictive and that changes and modifications may be made without departing from the spirit or scope of the invention as set forth in the claims appended hereto. For example in the locking mechanism, the bail 341 and compression spring 339, representative of a safety feature, could be eliminated by merely placing a handle on the positioning disc 338, whereby the mechanism would still be mechanically operable.

Having thus described my invention, what I desire to secure by United States Letters Patent is:

1. In a sales registering apparatus, the combination comprising an accumulator, differential actuators therefor, drive means for said actuators, total control means for causing said actuators to take a total from said accumulator, sub-total control means for causing said actuators to take a sub-total from said accumulator, a manually operable actuating device selectively movable into one position to actuate said total control means and movable into a second position to actuate said sub-total control means, a key controlled lock, control means selectively settable to cause said lock to normally lock said actuating device against movement into one of said positions thereof only or against movement into both of said positions hereof, and a key for selectively releasing said lock.

2. In a sales registering apparatus, the combination comprising an accumulator, differential actuators therefor, drive means for said actuators, total control means for causing said actuators to take a total from said accumulator, sub-total control means for causing said actuators to take a sub-total from said accumulator, a manually operable actuating device selectively movable into one position to actuate said total control means and movable into a second position to actuate said sub-total control means, a lock comprising a barrel element, a casing element movable relative to said barrel element, locking means for locking said elements relative to each other, and a key for selectively releasing said locking mechanism; means operably connecting said actuating device to one of said elements, and means for preventing movement of the other of said elements in one direction whereby to prevent movement of said actuating device into one of said positions thereof when said locking means is effective to lock said elements relative to each other.

3. A sales registering apparatus comprising the combination of a lock barrel, means for selectively preventing movement of said barrel or permitting movement of said barrel, a lock casing movable relative to said barrel, locking mechanism for selectively locking said casing relative to said barrel, a manually operable member, means connecting said member to said casing for normally moving said casing, differential actuators, an accumulator, means for engaging said accumulator with said actuators, normally ineffective drive means for said actuators, a selectively operable key for releasing said locking mechanism, and means operable by said casing upon movement thereof by said manually operable member for first causing operation of said engaging means and for thereafter rendering said drive means effective.

4. In a sales registering apparatus, the combination comprising an accumulator, differential actuators therefor, drive means for said actuators, total control means for causing said actuators to take a total from said accumulator, sub-total control means for causing said actuators to take a sub-total from said accumulator, a lock barrel, means for selectively preventing movement of said barrel or permitting movement of said barrel in one direction only, a casing movable relative to said barrel, lock means for locking said casing relative to said barrel, a key for selectively releasing said locking means, and a manually operable actuating mechanism operatively connected to said casing and movable in said one direction to actuate said one of said control means and movable in another direction to actuate the other of said control means.

5. In a sales registering apparatus, the combination comprising an accumulator, differential actuators therefor, drive means for said actuators, total control means for causing said actuators to take a total from said accumulator, sub-total control means for causing said actuators to take a sub-total from said accumulator, a lock barrel, means selectively preventing rotation of said barrel or permitting rotation of said barrel in one direction only, a lock casing mounted for rotation relative to said barrel, locking means for locking said casing relative to said barrel, a key for selectively releasing said locking means, and a manually operable actuating device operatively connected to said casing, said actuating device being rockable in said one direction about the axis of said barrel into one position to actuate said one of said control means and rockable in the opposite direction into a second position to actuate said sub-total means.

6. In a sales registering apparatus, the combination with a registering mechanism, and means including a first control device for controlling said mechanism in one manner and a second control device for controlling said mechanism in a second manner; a hollow lock casing, means rotatably supporting said casing for movement in either of opposite directions from a neutral position, a lock barrel in said casing, locking means normally preventing rotation of said casing relative to said barrel, control means responsive to movement of said casing in one of said directions from said neutral position for actuating said first control device, a second control means responsive to movement of said casing in the opposite direction from said neutral position for actuating said second control device, means preventing movement of said barrel in one of said directions from said neutral position, and a key for releasing said locking means whereby to permit movement of said casing in either of said opposite directions from said neutral position.

7. In a sales registering apparatus, the combination with a registering mechanism, and means including a first control device for controlling said mechanism in one manner and a second control device for controlling said mechanism in a second manner; of a hollow lock casing, means rotatably supporting said casing for movement in either of opposite directions from a neutral position, a lock barrel in said casing, locking mechanism normally preventing rotation of said casing relative to said barrel, control means responsive to movement of said casing in one of said directions from said neutral position for actuating said first control device, a second control means responsive to movement of said casing in the opposite direction from said neutral position for actuating said second control device, selectively settable means normally effective to prevent movement of said barrel in one of said directions, said last mentioned means being settable to prevent movement of said barrel in either of said opposite directions, and a key for releasing said locking means whereby to permit movement of said casing in either of said opposite directions.

8. A sales registering apparatus, comprising the combination of a movable lock barrel, means preventing movement of said barrel in one direction only, a lock casing movable relative to said barrel, locking mechanism for selectively locking said casing to said barrel, a manually operable member, means connecting said member to said casing for normally moving said casing, differential actuators, an accumulator, means for engaging said accumulator with said actuator, normally ineffective drive means for said actuators, means for releasing said locking mechanism between said barrel and said casing for movement of said casing in one direction, said barrel and said casing being freely movable in the opposite direction, and means operable by said casing upon movement thereof by said manually operable member for first causing operation of said engaging means, and for thereafter rendering said drive means effective.

9. In a sales registering apparatus, the combination comprising an accumulator, differential actuators therefor, means for controlling engagement of said accumulator with said actuators, normally ineffective drive means for said actuators, a manually operable control device movable through a predetermined distance for actuating said engagement controlling means, control means for rendering said drive means effective, means controlled by said engagement controlling means upon operation thereof for normally causing operation of said control means, and means controlled by said control device for preventing operation of said control means during movement of said control device through said predetermined distance and for enabling operation of said control means upon movement of said control device beyond said predetermined distance.

10. In a sales registering apparatus, the combination comprising an accumulator, differential actuators therefor, means for controlling engagement of said accumulator with said actuators, normally ineffective drive means for said actuators, a manually operable control device movable through a predetermined distance for actuating said engagement controlling means, control means for rendering said drive means effective, means including a yieldable device controlled by said engagement controlling means for causing said operation of said control means; and means controlled by said control device for restraining said yieldable device during movement of said control device through said predetermined distance and for releasing said yieldable device to cause operation of said control means upon movement of said control device beyond said predetermined distance.

11. In a sales registering apparatus, the combination comprising an accumulator, differential actuators therefor, means for controlling engagement of said accumulator with said actuators, normally ineffective drive means for said actuators, a manually operable camming device movable through a predetermined distance for actuating said engagement controlling means, control means for rendering said drive means effective, means including a yieldable device controlled by said camming device upon operation thereof for causing operation of said control means; and means actuated by said camming device for blocking said yieldable device during movement of said camming device through said predetermined distance and for releasing said yieldable device upon movement of said camming device beyond said predetermined distance.

12. In a sales registering apparatus, the combination comprising an accumulator, differential actuators therefor, normally ineffective drive means for said actuators, total control means far causing said actuators to take a total from said accumulator, sub-total control means for causing said actuators to take a sub-total from said accumulator, a manually operable control device movable through a predetermined distance in one direction from a neutral position for controlling said total control means, said control device being movable through a predetermined distance in the opposite direction from said neutral position for controlling said sub-total control means, means controlled by said control device for normally rendering said drive means effective, and means controlled by said control device upon movement thereof through said predetermined distance in either of said directions for preventing operation of said last mentioned means and for enabling operation of said last mentioned means upon movement of said control device beyond said predetermined distance in either of said directions.

13. In a sales registering apparatus, the combination comprising an accumulator, differential actuators therefor, normally ineffective drive means for said actuators, total control means for causing said actuators to take a total from said accumulator, sub-total control means for causing said actuators to take a sub-total from said accumulator, a manually operable control device movable through a predetermined distance in one direction from a neutral position for controlling said total control means, said control device being movable through a predetermined distance in the opposite direction from said neutral position for controlling said sub-total control means, yieldable means controlled by said control device for rendering said drive means effective, blocking means operable by said control device upon movement thereof through said predetermined distance in either of said directions for blocking operation of said yieldable means and for releasing said yieldable means upon movement of said control device beyond said predetermined distance in either of said directions.

References Cited in the file of this patent
UNITED STATES PATENTS

| | | |
|---|---|---|
| 1,886,822 | Main | Nov. 8, 1932 |
| 1,929,985 | Main | Oct. 10, 1933 |
| 2,265,125 | Beria | Dec. 9, 1941 |
| 2,792,176 | Lippert | May 14, 1957 |
| 2,801,047 | Landsiedel | July 30, 1957 |
| 2,815,912 | Lezius | Dec. 10, 1957 |